US010377463B2

(12) United States Patent
Chourreau et al.

(10) Patent No.: US 10,377,463 B2
(45) Date of Patent: Aug. 13, 2019

(54) AIRCRAFT COMPRISING A HATCH AND A FALL-PROTECTION DEVICE

(71) Applicant: Airbus Operations (S.A.S.), Toulouse (FR)

(72) Inventors: Yannick Chourreau, Montberon (FR); Loic Challancin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 885 days.

(21) Appl. No.: 14/838,383

(22) Filed: Aug. 28, 2015

(65) Prior Publication Data

US 2016/0185440 A1 Jun. 30, 2016

(30) Foreign Application Priority Data

Sep. 29, 2014 (FR) ...................................... 14 59218

(51) Int. Cl.
  *B64C 1/14* (2006.01)
  *B64C 1/32* (2006.01)
(52) U.S. Cl.
  CPC .............. *B64C 1/1407* (2013.01); *B64C 1/14* (2013.01); *B64C 1/32* (2013.01); *Y10T 292/03* (2015.04); *Y10T 292/28* (2015.04)
(58) Field of Classification Search
  CPC ....... Y10T 292/03; Y10T 292/28; B64C 1/14; B64C 1/1407; B64C 1/32

(Continued)

(56) References Cited

U.S. PATENT DOCUMENTS

| 1,082,909 | A | * | 12/1913 | Rixson | .................... E05C 17/22 |
| | | | | | 292/262 |
| 2,199,369 | A | * | 4/1940 | Bernstein | ................ E05C 17/36 |
| | | | | | 292/262 |

(Continued)

FOREIGN PATENT DOCUMENTS

| DE | 945975 C | * | 7/1956 | ............... B64C 1/14 |
| DE | 1064348 B | * | 8/1959 | ............... B64C 1/32 |

(Continued)

OTHER PUBLICATIONS

French Search Report for Application No. 1459218 dated May 20, 2015.

(Continued)

*Primary Examiner* — Carlos Lugo
(74) *Attorney, Agent, or Firm* — Jenkins, Wilson, Taylor & Hunt, P.A.

(57) ABSTRACT

An aircraft having a hatch and a fall-protection device includes a structure comprising a roof pierced with an opening, a cover plate, and a lock provided to adopt a locking position, in which the lock holds the cover plate in the closed position in the opening, or, alternatively, an unlocked position, in which the lock does not hold the cover plate. The aircraft further comprises at least one fall-protection device provided so that, when the lock moves into the unlocked position, it is in a first position to allow movement of the cover plate under the influence of gravity from its closed position to an intermediate position, in which the cover plate is suspended from the structure and then moves from the first position into a second position, during which movement the cover plate moves from the intermediate position into an open position, no longer attached to the structure.

18 Claims, 4 Drawing Sheets

(58) Field of Classification Search
USPC .......... 292/246–250, 262; 105/348; 296/148; 244/129.5
See application file for complete search history.

(56) References Cited

U.S. PATENT DOCUMENTS

| | | | | |
|---|---|---|---|---|
| 2,453,937 A * | 11/1948 | Ray | ............................ | B64C 1/24 |
| | | | | 105/447 |
| 2,673,760 A * | 3/1954 | Hawks | ..................... | E05C 17/36 |
| | | | | 16/65 |
| 2,754,904 A * | 7/1956 | Provenzano | .......... | B64C 1/1407 |
| | | | | 160/371 |
| 2,965,336 A * | 12/1960 | Lissarrague | .............. | B64C 1/32 |
| | | | | 220/279 |
| 3,745,709 A * | 7/1973 | Perina | ....................... | E06B 1/60 |
| | | | | 49/465 |
| 3,893,725 A * | 7/1975 | Coulter | .................. | B65D 45/02 |
| | | | | 220/318 |
| 4,220,298 A * | 9/1980 | Willis | ..................... | B64C 1/1407 |
| | | | | 160/354 |
| 4,288,119 A * | 9/1981 | Geiger | .................... | E05C 17/36 |
| | | | | 292/262 |
| 4,312,153 A * | 1/1982 | Parkinson | ................ | E06B 7/231 |
| | | | | 244/129.5 |
| 4,785,741 A | 11/1988 | Gronow | | |
| 5,297,692 A * | 3/1994 | Kronmiller | ............. | B65D 45/28 |
| | | | | 220/318 |
| 6,041,960 A * | 3/2000 | Leal | ....................... | B65F 1/1615 |
| | | | | 215/306 |
| 7,175,213 B1 * | 2/2007 | Blangiardo | ........... | E05B 13/002 |
| | | | | 292/1 |
| 7,690,617 B2 * | 4/2010 | Takao | .................... | A47B 97/00 |
| | | | | 248/499 |
| 8,328,137 B2 | 12/2012 | Suetthoff et al. | | |
| 8,826,597 B2 * | 9/2014 | Raspic | ................. | B61D 19/023 |
| | | | | 244/129.3 |
| 9,511,846 B2 * | 12/2016 | Auriac | .................. | B64C 1/1423 |
| 2017/0144743 A1 * | 5/2017 | Dickson | ................. | B64C 1/067 |

FOREIGN PATENT DOCUMENTS

| | | | | |
|---|---|---|---|---|
| EP | 0 261 329 A2 | | 3/1988 | |
| EP | 2 439 135 A1 | | 4/2012 | |
| FR | 2547852 A1 | * | 12/1984 | .............. E05C 17/14 |
| GB | 2236515 A | * | 4/1991 | ................ B64C 1/32 |
| WO | WO-2017208157 A1 | * | 12/2017 | ........... E64C 1/1407 |

OTHER PUBLICATIONS

Chinese Office Action for Application No. 201510617488.7 dated Feb. 28, 2019.

* cited by examiner

US 10,377,463 B2

AIRCRAFT COMPRISING A HATCH AND A FALL-PROTECTION DEVICE

CROSS-REFERENCE TO RELATED APPLICATION

This application claims the benefit of and priority to French patent application No. 14 59218 filed on Sep. 29, 2014, the entire disclosure of which is incorporated by reference herein.

TECHNICAL FIELD

The present disclosure relates to an aircraft comprising a structural hatch connected to a cover plate and at least one fall-protection device preventing the cover plate from falling, as well as a fall-protection device of this kind.

BACKGROUND

At present in the event of an accident a structural hatch located in the upper section of a cockpit is provided in order to access the inside of the aircraft cockpit when the cockpit door cannot be opened. This structural hatch is connected to a cover plate.

The aircraft comprises a lock or locking means which keep the cover plate in the closed position fixed to the aircraft structure and actuating means (for example, a fixed arm on one side of the structural hatch) connected to the structural hatch which apply pressure to the locking means. When the structural hatch has to be opened, the locking means are unlocked from the inside or the outside and the cover plate is no longer fixed to the structure of the aircraft.

Hence, when the structural hatch moves into the open position, the cover plate falls inside the cockpit and risks striking the individuals present in the cockpit.

SUMMARY

An object of the present disclosure is to disclose an aircraft comprising a fall-protection device that prevents the cover plate from falling on the individuals present under the cover plate once it has been released.

To this end, an aircraft is disclosed comprising:
a structure exhibiting a roof pierced with an opening;
a cover plate; and
a lock to adopt a locking position in which the lock holds the cover plate in the closed position in the opening or, alternatively, an unlocked position in which the lock does not hold the cover plate;
the aircraft further comprising:
at least one fall-protection device provided so that when the lock moves into the unlocked position it is in a first position in which it allows movement of the cover plate under the influence of gravity from its closed position to an intermediate position in which the cover plate is suspended, within the aircraft and not outside it, from the structure within the aircraft and then moves from the first position into a second position during the course of which the cover plate moves from the intermediate position into an open position in which it is no longer attached to the structure.

An aircraft equipped in this manner with a fall-protection device of this kind allows the cover plate to be stopped from falling before it can be completely removed.

The movement from the first position into the second position advantageously takes place under the action of a force which is non-collinear with gravity.

The external force is advantageously substantially perpendicular to the direction of gravity.

The fall-protection device advantageously comprises:
a shoe fixed to the structure;
a rigid arm exhibiting a first end integral with the shoe and extending from the shoe in a direction substantially perpendicular to gravity;
a first strip fastener fixed on a first face of the rigid arm;
a second strip fastener fixed on a second face of the rigid arm opposite the first face, the length of the second strip fastener being such that by bending about a second end, referred to as the free end, of the arm, it can be folded on the first strip fastener, becoming fixed there in a removable manner along the joining surface;
a flexible link comprising at one of its ends a first ring provided to be fixed to the arm in the fold of the second strip fastener and, at the other of its ends, a second ring provided to be fixed to the cover plate.

The first strip fastener advantageously does not extend as far as the free end of the arm and the first ring is positioned at the level of the zone free from strip fastener.

The fixing assembly advantageously constitutes a single fixing assembly that passes through the rigid arm.

The disclosure herein likewise provides a fall-protection device provided to be put into operation in an aircraft according to one of the preceding variants.

BRIEF DESCRIPTION OF THE DRAWINGS

The characteristics of the disclosure herein referred to above, as well as others, will become clearer on reading the following description of an exemplary embodiment, the description being given in relation to the attached drawings in which.

DETAILED DESCRIPTION

In the following description, terms relating to a position are taken to refer to an aircraft in the normal operating position.

Figure 1:
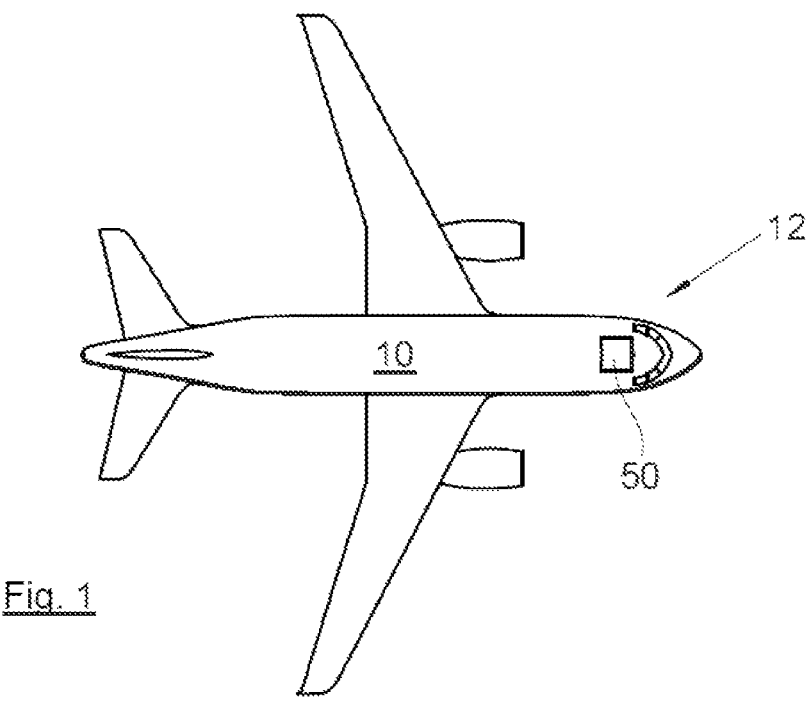
FIG. 1 depicts an aircraft according to the disclosure herein.

FIG. 1 shows an aircraft 10, the structure whereof exhibits a roof pierced with an opening (56, FIG. 2) above a cockpit 12. The aircraft 10 likewise exhibits a structural hatch (not shown) and a cover plate 50 which close off the opening 56. The structural hatch is traditionally directly accessible from the outside of the aircraft 10 and enables the cover plate 50 present on the roof of the cockpit 12 to be reached, in order to open it and access the cockpit 12.

In the rest of the description, the cover plate 50 is disposed on the roof of the cockpit 12 and aligned with the structural hatch (where the latter is situated on the aircraft 10).

Figure 2:
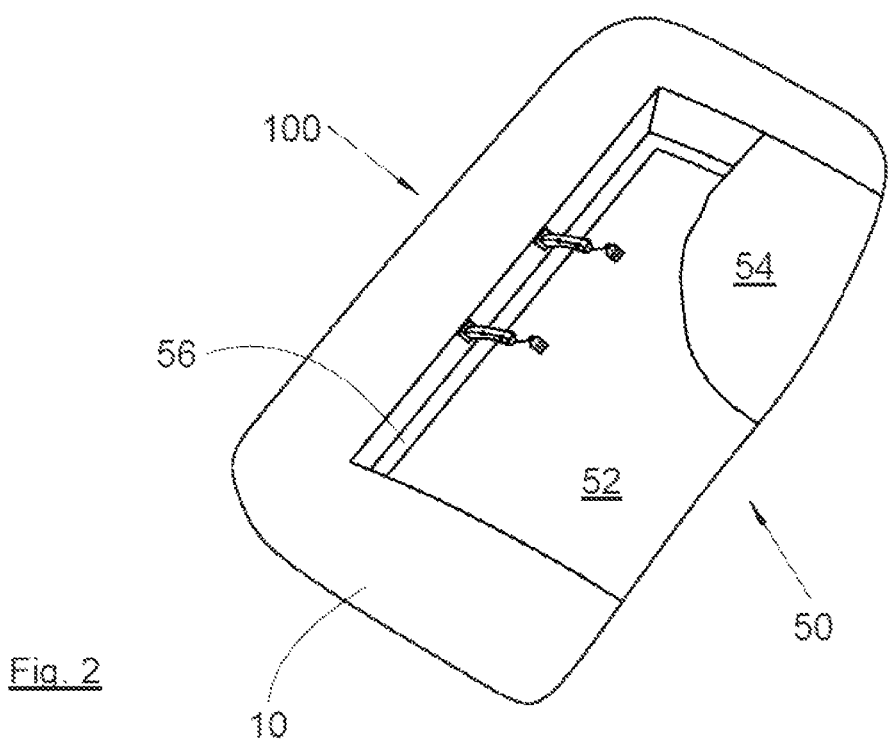
FIG. 2 shows a cover plate and fall-protection devices according to the disclosure herein.

FIG. 2 shows the inner face 52 of the cover plate 50, in other words that which is turned towards the inside of the cockpit 12, whereas the outer face 54, in other words the face which is oriented towards the outside of the aircraft 10, has been partially removed to make FIG. 2 easier to understand.

In accordance with the cover plate in the state of the art, the aircraft 10 comprises a lock (see, e.g., 20, FIGS. 3A-3C) provided to adopt a locking position (see, e.g., 20, FIG. 3A) in which it keeps the cover plate 50 in the closed position in the opening 56, or, alternatively, an unlocked position (see, e.g., 20, FIGS. 3B and 3C) in which it does not hold the cover plate 50, which is then free to move.

In the locking position, the lock locks the cover plate 50 on the aircraft structure 10.

When the lock is unlocked, the cover plate 50 moves under its own weight in the direction of gravity, in other words in this case substantially perpendicularly to the plane of the opening 56, into an intermediate position in which the cover plate 50 is suspended, hanging inside or within the aircraft 10 and not outside it, from the structure of the aircraft 10 by fall-protection devices 100 (two of which can be seen in FIG. 2).

When the lock moves into the unlocked position, each fall-protection device 100 is in a first position in which it allows movement of the cover plate 50 under the influence of gravity from its closed position up to the intermediate position in which the cover plate 50 is suspended, within the aircraft structure 10 and not outside it, from the aircraft structure 10 by the fall-protection devices 100. In this intermediate position, the cockpit 12 is accessible from the outside of the aircraft 10.

Each fall-protection device 100 then moves from the first position into a second position, during the course of which the cover plate 50 moves from the intermediate position into an open position in which it is no longer attached to the structure of the aircraft 10.

The movement from the first position into the second position takes place under the action of a force that is non-collinear with gravity.

Each fall-protection device 100 thereby limits the movement of the cover plate 50 in the direction of gravity up to the intermediate position in which the cover plate 50 is suspended and therefore prevents it from falling into the cockpit 12. Then, under the action of an external force, traditionally the action of an individual positioned in the cockpit 12, each fall-protection device 100 moves into the second position in which the cover plate 50 is released and can be disengaged from the opening 56.

The external force is preferably substantially perpendicular to the direction of gravity. It is a horizontal pull, for example, applied by the staff present in the cockpit 12 on the cover plate 50 suspended in the intermediate position. Hence the members of staff hold the cover plate 50 during the final release phase and are therefore able to direct it without there being any risk of it falling.

Figure 3A:
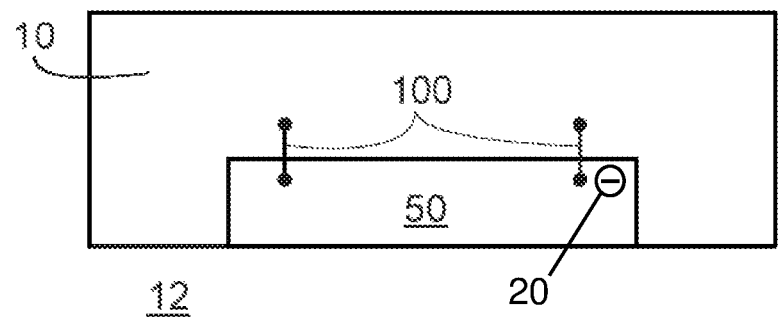
FIGS. 3A-3C show different release stages of the cover plate.
Figure 3B:
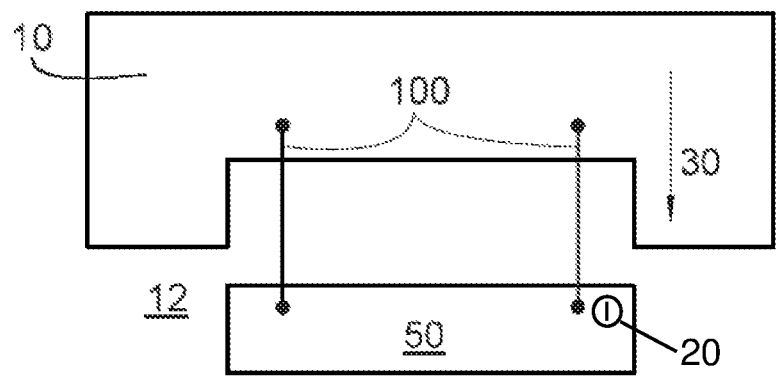
Figure 3C:
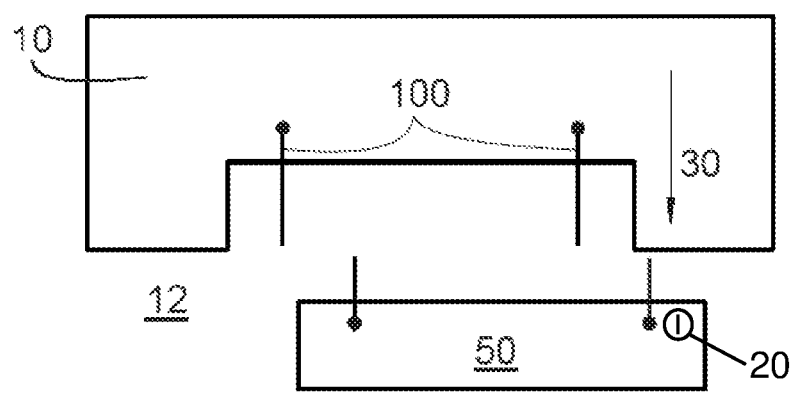

FIGS. 3A-3C show different release stages of the cover plate 50.

In FIG. 3A, the cover plate 50 is in the closed position held by the lock 20.

In FIG. 3B, the lock 20 is unlocked and the cover plate 50 falls into the intermediate position under the influence of gravity 30 and is held in this intermediate position by fall-protection devices 100, which are in the first position.

In FIG. 3C, the outside force 32 carries the movement of each fall-protection device 100 into the second position, and the cover plate 50 is then moved into the disengaged position by the breaking of the link attaching it to the structure of the aircraft 10.

The suspension length is in the order of 10 cm.

Figure 4A:
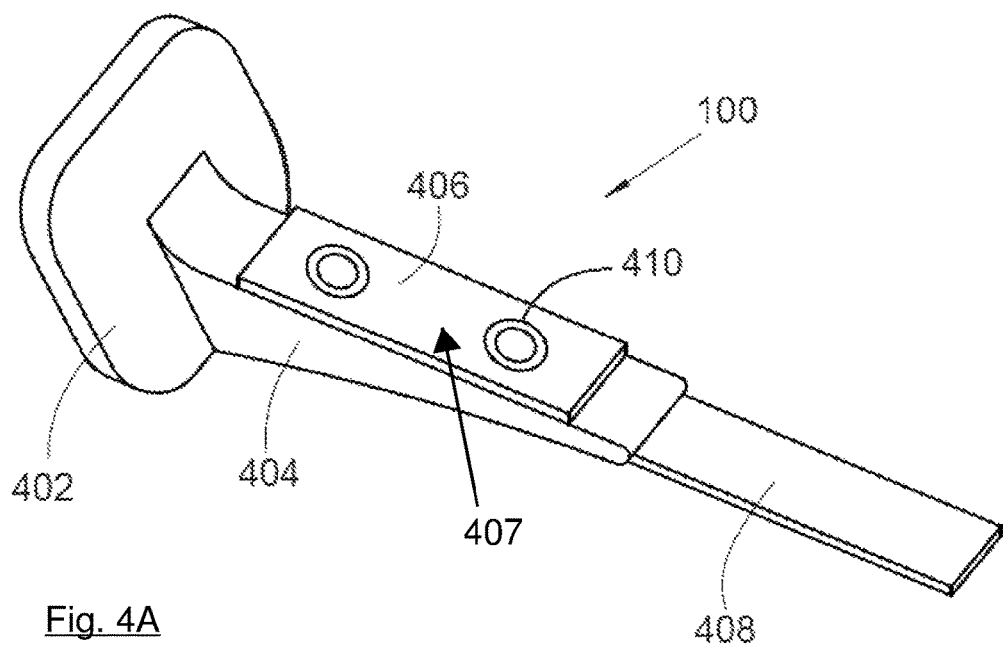
FIG. 4A is a view of a fall-protection device.
Figure 4B:
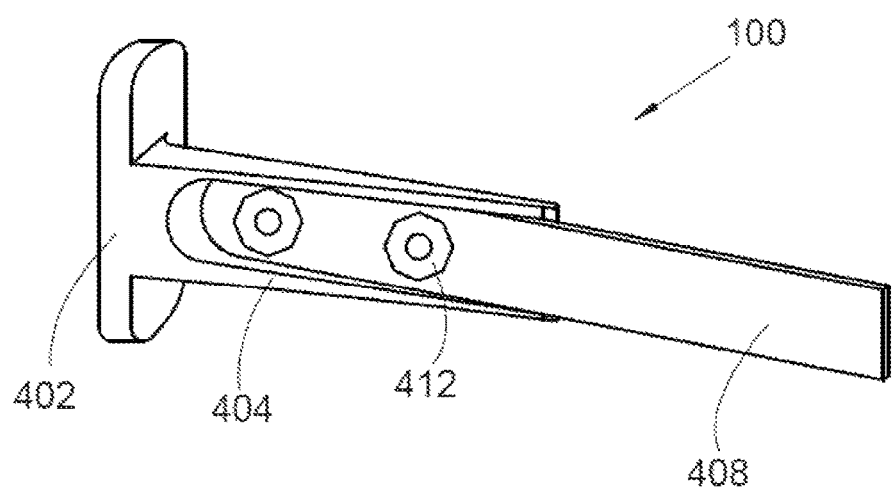
FIG. 4B is a view of the fall-protection device in FIG. 4A viewed from the other side.

FIG. 4A and FIG. 4B show a fall-protection device 100 which comprises a shoe 402 provided to be fixed to the structure of the aircraft 10 and a rigid arm 404. The rigid arm 404 exhibits a first end integral with the shoe 402 and extends from the shoe 402 in a direction substantially perpendicular to gravity 30, in other words substantially parallel to the plane of the opening 56.

The fall-protection device 100 likewise comprises a first strip fastener 406 fixed to a first face of the rigid arm 404.

According to one embodiment, the strip fastener 406 is adhered to the rigid arm 404. According to another particular embodiment, the first strip fastener 406 is fixed on the rigid arm by a fixing assembly 410 such as rivets or screws.

The fall-protection device 100 likewise comprises a second strip fastener 408 fixed on a second face of the rigid arm 404 opposite the first face and the length of the second strip fastener 408 is such that, by bending about a second end, referred to as the free end, of the arm 404, the second strip fastener 408 can be folded onto the first strip fastener 406, thereby being fixed thereon along a joining surface 407.

According to one embodiment, the strip fastener 408 is adhered to the rigid arm. According to another particular embodiment, the second strip fastener 408 is fixed to the rigid arm by a fixing assembly 412 such as rivets or screws.

So that the fixing of the first strip fastener 406 and the fixing of the second strip fastener 408 to the rigid arm 404 are achieved quickly, the fixing assembly 410 and 412 constitutes a single fixing assembly that passes through the rigid arm 404, so that the fixing of the strip fasteners 406 and 408 takes place simultaneously. The fixing assembly defined in this way is, for example, a rivet system passing through the rigid arm 404 or a screw-nut system.

The fall-protection device 100 is advantageously fixed to the structure of the aircraft 10 such that the second face of the rigid arm 404 on which the second strip fastener 408 is fixed is oriented towards the floor of the cockpit 12 and the first face of the rigid arm 404 on which the first strip fastener 406 is fixed is oriented on the opposite side to the floor.

The two strip fasteners 406 and 408 are provided to hook one onto the other in a removable manner, in other words they can be separated through the action of an outside force.

The strip fasteners 406 and 408 are preferably complementary hook-and-loop fasteners, for example VELCRO®.

The fall-protection device 100 likewise comprises a flexible link (502, FIG. 5) which comprises at one of its ends a first ring 504 provided to be fixed to the arm 404 in the fold of the second strip fastener 408 and, at the other of its ends, a second ring 506 provided to be fixed to the cover plate 50.

In the first position, the two strip fasteners 406 and 408 are meshed and in the second position, the two strip fasteners 406 and 408 are separated.

Figure 5:
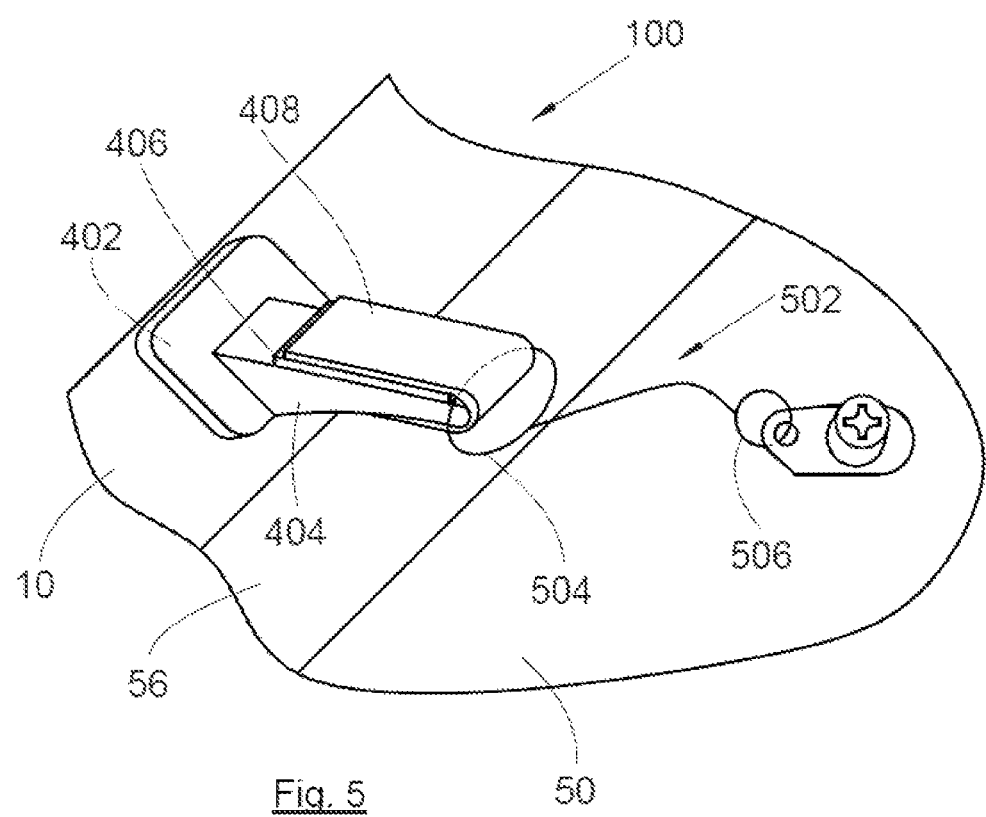
FIG. 5 is an enlargement of FIG. 2.

FIG. 5 shows the fall-protection device 100 in the first position. The first ring 504 is fixed to the arm 404 due to the fact that it is held in the fold of the second strip fastener 408 between the arm 404 and the second strip fastener 408.

The second ring 506 is fixed to the cover plate 50 here by a fixing screw.

When the cover plate 50 moves into the intermediate position, the link 502 tightens and the first ring 504 comes to rest on the free end of the arm 404 which supports the gravitational forces.

When the cover plate 50 is pulled by a person present in the cockpit 12, the force is exerted substantially parallel to the joining surface 407 and the two strip fasteners 406 and 408 then separate to release the first ring 504.

In order to allow the first ring 504 to be well positioned at the level of the free end of the arm 404, the first strip fastener 406 does not extend as far as the free end of the arm 404 and the first ring 504 is then able to position itself at the level of the zone free from the first strip fastener 406.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. An aircraft comprising:
    a structure comprising a roof pierced with an opening;
    a cover plate;
    a lock configured to occupy and move between a locking position, in which the lock holds the cover plate in a closed position in the opening, and an unlocked position, in which the lock does not hold the cover plate in the closed position; and
    at least one fall-protection device comprising:
        a shoe fixed to the structure;
        a rigid arm comprising a first end attached to the shoe and extending from the shoe in a direction substantially perpendicular to gravity;
        a first strip fastener fixed on a first face of the rigid arm;
        a second strip fastener fixed on a second face of the rigid arm opposite the first face, the length of the second strip fastener being such that, by a bending thereof about a second end of the rigid arm, the second strip fastener can be folded to at least partially cover the first strip fastener, thereby being removably fixed thereon along a joining surface; and
        a flexible link comprising, at a first end thereof, a first ring configured to be fixed to the rigid arm by a folded portion of the second strip fastener and, at second end thereof, a second ring configured to be fixed to the cover plate,
    wherein the at least one fall-protection device is configured such that:
        when the lock moves into the unlocked position, the at least one fall-protection device is in a first position, in which the at least one fall-protection device allows movement of the cover plate from the closed position to an intermediate position, in which the cover plate is suspended from the structure within the aircraft, and
        the cover plate is movable from the intermediate position to an open position, in which the cover plate is no longer attached to the structure.

2. The aircraft of claim 1, wherein the first strip fastener does not extend as far as the free end of the rigid arm and the first ring is positioned at a level of a zone of the rigid arm, the rigid arm being devoid of the first strip fastener at the level of the zone of the rigid arm where the first ring is positioned.

3. The aircraft of claim 1, comprising at least one fixing assembly that passes through the rigid arm.

4. The aircraft of claim 3, wherein the at least one fixing assembly comprises a single fixing assembly.

5. The aircraft of claim 3, wherein the at least one fixing assembly comprises a plurality of fixing assemblies.

6. The aircraft of claim 3, wherein the at least one fixing assembly comprises a rivet or a threaded fastener.

7. The aircraft of claim 1, wherein the fall-protection device is configured to prevent the cover plate from moving from the intermediate position into the open position while the second strip fastener is fixed to the first strip fastener at the joining surface.

8. The aircraft of claim 1, wherein the fall-protection device is configured to prevent the cover plate from moving from the intermediate position into the open position while the first ring is fixed to the rigid arm by the folded portion of the second strip fastener.

9. The aircraft of claim 1, wherein the cover plate will hang from the rigid arm via the flexible link in the intermediate position until the second strip fastener is disengaged from the first strip fastener.

10. The aircraft of claim 1, wherein the cover plate is suspended from the structure such that the cover plate is entirely within the aircraft.

11. The aircraft of claim 1, wherein the first strip fastener and the second strip fastener each respectively comprise a plurality of loops and/or a plurality of hooks formed on a surface thereof at the joining surface, the plurality of hooks being configured to interlock with the plurality of loops to secure the first and second strip fasteners together in a removable manner.

12. A fall-protection device for preventing a cover plate from falling on individuals present under the cover plate after a release of the cover plate from being held in an opening formed on a roof of a structure, the fall-protection device comprising:
    a shoe fixed to the structure;
    a rigid arm comprising a first end attached to the shoe and extending from the shoe in a direction substantially perpendicular to gravity;
    a first strip fastener fixed on a first face of the rigid arm;
    a second strip fastener fixed on a second face of the rigid arm opposite the first face, the length of the second strip fastener being such that, by a bending thereof about a second end of the rigid arm, the second strip fastener can be folded to at least partially cover the first strip fastener, thereby being removably fixed thereon along a joining surface; and
    a flexible link comprising, at a first end thereof, a first ring configured to be fixed to the rigid arm by a folded portion of the second strip fastener and, at second end thereof, a second ring configured to be fixed to the cover plate,
    wherein a lock configured to occupy and move between a locking position, in which the lock holds the cover plate in a closed position in the opening, and an unlocked position, in which the lock does not hold the cover plate in the closed position, is provided,
    wherein the flexible link is configured to removably secure the cover plate to the structure and prevent the cover plate from moving beyond an intermediate position, which is located between the first closed position and an open position, in which the cover plate is not secured to the structure,
    wherein the fall protection device is configured such that, when the lock moves into the unlocked position, the at least one fall-protection device is in a first position, in which the at least one fall-protection device allows movement of the cover plate from the closed position to an intermediate position, in which the cover plate is suspended from the structure within the aircraft, and wherein the at least one fall-protection device is configured so that the cover plate is movable from the intermediate position to the open position, in which the cover plate is no longer attached to the structure when the flexible link is detached from the structure.

13. The fall-protection device of claim 12, wherein the first strip fastener does not extend as far as the free end of the rigid arm and the first ring is positioned at a level of a zone of the rigid arm, the rigid arm being devoid of the first strip fastener at the level of the zone of the rigid arm where the first ring is positioned.

14. The fall-protection device of claim 12, comprising at least one fixing assembly that passes through the rigid arm.

15. The fall-protection device of claim 12, wherein the fall-protection device is configured to prevent the cover plate from moving from the intermediate position into the open position while the second strip fastener is fixed to the first strip fastener at the joining surface.

16. The fall-protection device of claim 12, wherein the fall-protection device is configured to prevent the cover plate from moving from the intermediate position into the open position while the first ring is fixed to the rigid arm by the folded portion of the second strip fastener.

17. The fall-protection device of claim 12, wherein the cover plate is suspended from the structure such that the cover plate is entirely within the aircraft.

18. The fall-protection device of claim 12, wherein the first strip fastener and the second strip fastener each respectively comprise a plurality of loops and/or a plurality of hooks formed on a surface thereof at the joining surface, the plurality of hooks being configured to interlock with the plurality of loops to secure the first and second strip fasteners together in a removable manner.

* * * * *